United States Patent
Käppi

(10) Patent No.: US 7,907,087 B2
(45) Date of Patent: Mar. 15, 2011

(54) SATELLITE BASED POSITIONING OF A WIRELESS TERMINAL

(75) Inventor: Jani Käppi, Ylojarvi (FI)

(73) Assignee: Nokia Corporation, Espoo (FI)

( * ) Notice: Subject to any disclaimer, the term of this patent is extended or adjusted under 35 U.S.C. 154(b) by 1334 days.

(21) Appl. No.: 11/418,834

(22) Filed: May 5, 2006

(65) Prior Publication Data

US 2007/0258485 A1 Nov. 8, 2007

(51) Int. Cl.
*G01S 19/07* (2010.01)
(52) U.S. Cl. .................. 342/357.28; 701/214
(58) Field of Classification Search ............... 370/522; 342/357.28, 357.29, 358; 701/214, 216
See application file for complete search history.

(56) References Cited

U.S. PATENT DOCUMENTS

| | | | |
|---|---|---|---|
| 5,323,322 A | | 6/1994 | Mueller et al. |
| 6,647,340 B1 * | | 11/2003 | Pemble et al. ............... 701/214 |
| 6,862,526 B2 | | 3/2005 | Robbins |
| 2003/0154025 A1 | | 8/2003 | Fuchs et al. |
| 2003/0163256 A1 * | | 8/2003 | Edwards et al. ............. 701/214 |
| 2005/0231423 A1 * | | 10/2005 | Han et al. .................. 342/357.02 |
| 2009/0027264 A1 * | | 1/2009 | Chen et al. ................ 342/357.12 |
| 2009/0058722 A1 * | | 3/2009 | Trautenberg ............. 342/357.12 |
| 2010/0141510 A1 * | | 6/2010 | Dai et al. ................. 342/357.03 |

FOREIGN PATENT DOCUMENTS

| | | |
|---|---|---|
| WO | WO 2004/095055 | 11/2004 |
| WO | WO 2004/095055 A1 * | 11/2004 |

OTHER PUBLICATIONS

H.W. Janes et al., "Analysis of tropospheric delay prediction models: comparisons with ray-tracing and implications for GPS relative positioning", 1991, Bulletin Geodesique, pp. 151-160.*
P. Misra et al., "Global Positioning System: Signals, Measurements, and Performance", 2001, Ganga-Jamuna Press, pp. 145- 149.*
"Broadcast network assistance for enhanced observed time difference (E-otd) and global positioing system (GPS) positioning methods;" 3GPP Technical specification group GSM EDGE radio access network; location services (LCS); 3GPP TS 44.035 V6.0.0 (Feb. 2005).
"RINEX—The Receiving Independent Exchange Format Version 2.10;" Werner Gunner; Jan. 25, 2002.
B.W. Parkinson, et al; Global Positioning System: Theory and Applications, Chapter 13; J.J. Spilker, Jr.: "Tropospheric Effects on GPS"; vol. I, 1996; pp. 517-546.

* cited by examiner

*Primary Examiner* — Melvin Marcelo
(74) *Attorney, Agent, or Firm* — Alfred A. Fressola; Ware, Fressola, Van Der Sluys Y Adolphson LLP

(57) ABSTRACT

At least one set of values of parameters is determined, each set of values defining a respective troposphere model. The at least one determined set of parameter values is then assembled for transmission via a wireless communication network to a wireless terminal as assistance data for an assisted satellite based positioning of the wireless terminal.

29 Claims, 5 Drawing Sheets

| Parameter | # Bits | Scale Factor | Units |
|---|---|---|---|
| Troposphere Model Control (once per model) | | | |
| UTC$^{(u)}$ | 32 | 1 | sec |
| Fit Interval | 6 | --- | h |
| $C_{lat}$ | 14 | $2^{-13}$ | semi-circle |
| $C_{lon}$ | 14 | $2^{-13}$ | semi-circle |
| $R_c$ | 10$^{(u)}$ | $2^{10}$ | m |
| Zenith Delay Parameters (once per model) | | | |
| $Z_{h0}$ | 12$^{(u)}$ | $2^{-10}$ | m |
| $s_0$ | 14 | $2^{-26}$ | |
| $s_1$ | 14 | $2^{-32}$ | |
| $e_h$ | 12$^{(u)}$ | $2^{-20}$ | |
| $Z_{w0}$ | 12$^{(u)}$ | $2^{-10}$ | m |
| $e_w$ | 12$^{(u)}$ | $2^{-20}$ | |
| Mapping Function Parameters (once per model) | | | |
| 0 | 16$^{(u)}$ | $2^{-19}$ | |
| 1 | 16$^{(u)}$ | $2^{-19}$ | |
| 2 | 16$^{(u)}$ | $2^{-19}$ | |
| 0 | 16$^{(u)}$ | $2^{-19}$ | |
| 1 | 16$^{(u)}$ | $2^{-19}$ | |
| 2 | 16$^{(u)}$ | $2^{-19}$ | |
| $z_0$ | 12 | $2^{-5}$ | |
| $z_1$ | 12 | $2^{-5}$ | |

Fig. 3

| Exponent, e (3 bits) | Mantissa, m (3 bits) | Floating-Point value, x | Fit Interval Value, F |
|---|---|---|---|
| 0 | 0 | 0.125 | $F < 0.125\ h$ |
| 0 | 1 | 0.25 | $F = 0.25\ h$ |
| 0 | $1 < m < 8$ | $(m+1) * 2^{-3}$ | $F = \{0.375h, 0.5h, 0.625h, 0.75h, 0.875h, 1.0h\}$ |
| $1 < e < 7$ | $0 <= m < 8$ | $(m+1) * 2^{(e-1)}$ | $F = x\ h$ |
| 7 | $0 <= m < 7$ | $(m+1) * 2^{(e-1)}$ | $F = x\ h$ |

Fig. 4

SATELLITE BASED POSITIONING OF A WIRELESS TERMINAL

FIELD OF THE INVENTION

The invention relates to methods for supporting a satellite based positioning of a wireless terminal. The invention relates equally to a corresponding apparatus, to a corresponding network element, to a corresponding system, to a corresponding wireless terminal arrangement and to corresponding software program products.

BACKGROUND OF THE INVENTION

A satellite based positioning of a device is supported by various Global Navigation Satellite Systems (GNSS). These include for example the American Global Positioning System (GPS), the Russian Global Orbiting Navigation Satellite System (GLONASS), the future European system GALILEO, the Space Based Augmentation System (SBAS), the Japanese GPS augmentation Quasi-Zenith Satellite System (QZSS), the Locals Area Augmentation System (LAAS), and hybrid systems.

It is the general idea of GNSS positioning to receive satellite signals at a receiver, which is to be positioned, and to determine the time it took the signals to propagate from a respective satellite to the receiver. This time of flight can be determined for example based on a measured time of arrival of the satellite signal at the receiver and based on information on the time of transmission of the signal at the satellite, which is included in the received signal. By multiplying the time of flight with the speed of light, it is converted to the distance between the receiver and the respective satellite. Further, the positions of the satellites at the respective time of transmission are estimated, for example based on information included in the signal.

The computed distances and the estimated positions of the satellites then permit a calculation of the current position of the receiver, since the receiver is located at an intersection of the distances from a set of satellites.

The assumption that the distance between the receiver and a respective satellite can be obtained by multiplying the determined time of flight of a satellite signal with the speed of light is based on a simplification, though. A signal traveling from a satellite to a GNSS receiver passes through the electrically neutral atmosphere, including the troposphere and the stratosphere. This electrically neutral atmosphere comprises different and varying refractive indices at different locations. The variability of the refractive index causes the satellite signals to be affected by a path delay and by ray bending. The effect is commonly known as tropospheric delay or slant delay. It is difficult to compensate fully for the tropospheric delay. It constitutes one of the major residual error sources in GNSS navigation solutions.

For correcting the delay, it is generally assumed that the atmosphere is horizontally layered and azimuthally symmetric. The tropospheric delay may then be determined as a sum of two components, namely a hydrostatic component and a non-hydrostatic component. The hydrostatic component is due to atmospheric gases that are in hydrostatic equilibrium, including usually dry gases and part of the water vapor. The non-hydrostatic component is due water vapor in the atmosphere that is not in hydrostatic equilibrium. Moreover, each of these components can be expressed as the product of the delay experienced by the GNSS signals in the zenith direction and a mapping function, which models the elevation angle dependency of the tropospheric delay. With such an approach, the total tropospheric delay $Z(\epsilon)$ of a particular satellite signal can be determined according to the following equation:

$$Z(\epsilon) = Z_h \cdot m_h(\epsilon) + Z_w \cdot m_w(\epsilon) \quad (1)$$

Here, $Z_h$ is the hydrostatic zenith delay, that is, the delay due to a hydrostatic influence that would be experienced by a signal traveling from a satellite to the receiver, when the satellite is located at the zenith of the receiver. Further, $m_h(\epsilon)$ is the hydrostatic mapping function for a given elevation angle $\epsilon$ of a satellite at the current position of the receiver. $Z_w$ is the non-hydrostatic zenith delay, that is, the delay due to a non-hydrostatic influence that would be experienced by a signal traveling from a satellite to the receiver, when the satellite is located at the zenith of the receiver. Further, $m_w(\epsilon)$ is the non-hydrostatic mapping function for a given elevation angle $\epsilon$ of a satellite at the current position of the receiver. A satellite at the zenith of a receiver has an elevation angle of 90°.

There are various known approaches for determining the zenith delay, like the Hopfield model or the SAAS model for the hydrostatic zenith delay and the Mendes model, the SAAS model, the Ifadis model or the Hopfield model for the non-hydrostatic zenith delay. Further, the zenith delay could be determined using numerical weather model data.

Typical troposphere delay models moreover use mapping functions in the form of continued fractions. The hydrostatic mapping function $m_h$ and the wet mapping function $m_w$ for an elevation angle $\epsilon$ may take for example the following form:

$$m_{h/w}(\varepsilon) = \frac{1 + \dfrac{a_0}{1 + \dfrac{a_1}{1 + a_2}}}{\sin(\varepsilon) + \dfrac{a_0}{\sin(\varepsilon) + \dfrac{a_1}{\sin(\varepsilon) + a_2}}} \quad (2)$$

For most existing mapping functions, the values of parameters $a_0$, $a_1$ and $a_2$ in equation (2) are determined separately for the hydrostatic delay and for the non-hydrostatic delay based on values of meteorological parameters, such as surface pressure and temperature. Examples are the Herring mapping functions, the Niell Mapping Functions (NMF), the Isobaric Mapping Functions (IMF) and the Vienna Mapping Functions (VMF). The Global Mapping Function (GMF) is moreover an empirical mapping function that is based on numerical weather model data. The model is determined by using a 15×15 degrees grid of monthly mean profiles for pressure, temperature and humidity from the European Centre for Medium-Range Weather Forecasts (ECMWF).

While equations (1) and (2) are based on the assumption that the atmosphere is azimuthally symmetric, pressure, temperature and humidity gradients may cause in addition in horizontal gradients in the refractivity field. This azimuthal asymmetry may introduce significant errors in measurements where high precision is required. To take account of this effect, it is possible to distinguish between the azimuthally symmetric delay, also referred to as isotropic delay, and asymmetric parts of the delay, also referred to as anisotropic delay. While above equation (1) for the total tropospheric delay only includes the isotropic delay, it can be supplemented by a third term for the anisotropic delay as follows:

$$Z(\epsilon,\phi) = Z_h \cdot m_h(\epsilon) + Z_w \cdot m_w(\epsilon) + m_g(\epsilon)\cot\epsilon(z_0 \cos\phi + z_1 \sin\phi) \quad (3)$$

In this equation, $z_0$ and $z_1$ are path delay gradient parameters, for instance vertically integrated refractivity gradients, in the North and East direction, respectively. The parameter $\phi$ is the azimuth angle at which a satellite is visible at a GNSS receiver, and $m_g$ is a special mapping function for the gradient term. It has to be noted that the anisotropic part of the equation could also be determined separately for hydrostatic and non-hydrostatic delay. A combination does not cause a significant loss of accuracy, though. Further, it has to be noted that the mapping function $m_g$ is not critical and can be chosen equal to $m_h$ or $m_w$.

In many situations, in particular with mobile GNSS receivers, meteorological parameter values are not available and nominal global parameter sets that are based on long term statistics are used for correcting tropospheric delays. Such global troposphere models, however, are not accurate enough for high precision positioning applications.

In some geodetic surveying applications, which are used for bridge constructions etc., zenith delay corrections and surface meteorological parameters are sent to the user, for example in the RINEX (receiver independent exchange) format. RINEX atmospheric corrections are mostly used in post processing, though, not in real time. The transmitted values are moreover limited to a particular position and have no ability to adjust, if the location or the altitude of the user changes. Further, the time dependency of the provided values is not taken into account, as it is assumed that a new parameter set is transmitted at short intervals, for example every second.

If a GNSS receiver is integrated into a wireless terminal or if a GNSS receiver is an accessory for a wireless terminal, the GNSS receiver may be assisted in the positioning by a wireless communication network. The wireless communication network may provide assistance data, which is received by the wireless terminal and used for improving the performance of the GNSS receiver. In addition, the wireless terminal may provide measurement results of the GNSS receiver to the wireless communication network, which performs the required positioning computations.

The availability of assistance data can greatly affect the performance of a GNSS receiver. The format in which assistance data may be sent to a wireless terminal is specified in various wireless communication standards. Control Plane solutions include Radio Resource Location Services Protocol (RRLP) in Global System for Mobile Communications (GSM), Rate Range Correction (RRC) in Wideband Code Division Multiple Access (W-CDMA) and IS-801.1/IS-801.A in Code Division Multiple Access (CDMA). Broadcast assistance data information elements for GSM are defined in 3GPP Technical Specification 44.035, V6.0.0: "Broadcast network assistance for Enhanced Observed Time Difference (E-OTD) and Global Positioning System (GPS) positioning methods". Finally, there are User Plane solutions OMA SUPL 1.0 by the Open Mobile Alliance, and various proprietary solutions for CDMA networks.

The assistance data that is provided according to current wireless standards may include for example a reference time, a reference location, clock correction data and ephemeris data, which describes a section of a satellite path for a short period of time, etc. However, it does not support a GNSS signal propagation delay estimation.

SUMMARY OF THE INVENTION

It is an object of the invention to support high accuracy satellite based positioning applications in wireless terminals.

A first method is proposed, which comprises determining at least one set of values of parameters, each set of values defining a respective troposphere model. The method further comprises assembling the at least one determined set of parameter values for transmission via a wireless communication network to a wireless terminal as assistance data for an assisted satellite based positioning of the wireless terminal.

Moreover, an apparatus is proposed, which comprises a processing component. The processing component is configured to determine at least one set of values of parameters, each set of values defining a respective troposphere model. The processing component is further configured to assemble the at least one determined set of parameter values for transmission via a wireless communication network to a wireless terminal as assistance data for an assisted satellite based positioning of the wireless terminal.

The processing component could be realized in hardware and/or software. It could be for instance a processor executing corresponding software program code, or a chip or chipset having an integrated circuit realizing the required functions.

Moreover, a network element of a wireless communication network is proposed. The network element comprises the proposed apparatus. In addition, it comprises a transmitting component configured to transmit at least one set of parameter values determined and assembled by the apparatus to a wireless terminal as assistance data for an assisted satellite based positioning of the wireless terminal.

The network element could be for instance a server of an assistance provider, which forwards the assembled values to a base station of the wireless communication network for a radio frequency transmission in a cell that is served by the base station. Such a transmission by a base station could be for example a point-to-point transmission to a particular wireless terminal, a broadcast transmission to any wireless terminal located sufficiently close to the base station, or a multicast transmission to any wireless terminal located sufficiently close to the base station and having subscribed to an assistance service.

Moreover, a system is proposed. The system comprises the proposed apparatus, for example integrated into a network element of a wireless communication network. The system further comprises a wireless terminal configured to receive at least one set of parameter values determined and assembled by the apparatus via a wireless communication network.

Moreover, a first software program product is proposed, in which a software program code is stored in a readable medium. When being executed by a processor, the software program code realizes the steps of the first proposed method.

For the side of the wireless terminal, further a method is proposed, which comprises receiving at a wireless terminal via a wireless communication network at least one set of values of parameters, each set of values defining a respective troposphere model. The method further comprises using an available set of values as assistance data for an assisted satellite based positioning of the wireless terminal.

Moreover, a wireless terminal arrangement is proposed, which comprises a mobile communication component configured to receive via a wireless communication network at least one set of values of parameters, each set of values defining a respective troposphere model. The wireless terminal arrangement further comprises a positioning component configured to use an available set of values as assistance data for an assisted satellite based positioning of the wireless terminal.

The wireless terminal arrangement could be a wireless terminal having an integrated positioning component. Alternatively, the wireless terminal arrangement could be a combination of a wireless terminal and an accessory device comprising the positioning component.

Finally, a second software program product is proposed, in which a software program code is stored in a readable medium. When being executed by a processor, the software program code realizing the steps of the second proposed method.

The invention proceeds from the idea that while the current wireless standards do not specify any troposphere model that could support the estimation of GNSS signal propagation delay at a wireless terminal, such a model could be provided as additional GNSS assistance data. It is therefore proposed that parameter values defining a respective troposphere model are determined and provided for transmission. A wireless terminal arrangement may receive such a model and use a received model as assistance data. The assistance data enables in this case a determination of a tropospheric delay, which is experienced by received satellite signals. This delay may then be considered in the positioning calculations.

It is an advantage of the invention that it enables a troposphere delay estimation based on flexibly determined troposphere models. This makes the troposphere delay estimation suitable for high accuracy GNSS navigation solutions.

In one embodiment of the invention, the parameters include at least one parameter for defining a time interval during which a troposphere model is valid. A limitation in time of the validity of a respective model allows providing models that are more accurate. The parameters for defining a time interval may comprise for example a parameter for defining a baseline time and a parameter for defining an interval length following upon the baseline time.

In one embodiment of the invention, the parameters include at least one parameter for defining an area in which a troposphere model is valid. The model is thus localized, not global, which allows as well providing models that are more accurate. The parameters for defining a validity area may comprise for example parameters for defining a central point of the area and a parameter for defining a size of the area. For instance, in case the area is specified to be a rectangle, the parameter for defining a size of the area could be the distance from the center point of the rectangle to a corner point of the rectangle.

In order to cover an extended time-period and/or a large coverage area while maintaining the accuracy of a respective model, several troposphere models could be provided, which are valid for different times and/or for different areas.

In general, an assistance provider could determine the required time and area that should be covered based on a respective use case and a respective application for which a satellite based positioning is required.

A wireless terminal arrangement could then select for a respective positioning an available set of parameters values of a troposphere model that is valid for a current time and for a current location of the wireless terminal as assistance data, and thus take account of spatial and temporal variations of the tropospheric delay, which is not possible with the currently employed global troposphere model.

In one embodiment of the invention, the parameters further include at least one zenith delay parameter for defining a tropospheric delay that would be experienced by a signal transmitted by a satellite and received by the wireless terminal, when the satellite was located at a zenith of the wireless terminal.

Advantageously, a hydrostatic zenith delay parameter and a non-hydrostatic zenith delay parameter are used.

The parameters may further include at least one parameter for specifying an adaptation rule, which can be used for adapting a value of the at least one zenith delay parameter to a current altitude of the wireless terminal. Such an adaptation can be performed for example separately for hydrostatic and non-hydrostatic zenith delay. Such height scale terms allow a zenith delay estimation at different user altitudes and enable thus a further increase of the accuracy of the troposphere model.

In one embodiment of the invention, the parameters further include parameters for at least one mapping function. Such a mapping function maps a value of the zenith delay parameter to a tropospheric delay that is experienced by a signal transmitted by a satellite and received by the wireless terminal, when the satellite is located at a known elevation angle to the wireless terminal. That is, the mapping function results in different values for different elevation angles.

Advantageously, a separate mapping function is provided for the hydrostatic and the non-hydrostatic components of the tropospheric delay.

While the mapping functions may be provided for the azimuthally symmetric distribution of the troposphere delay, the parameters may further include at least two gradient parameters for defining an azimuthally asymmetric effect of the tropospheric delay.

It is to be understood that while the above examples differentiate between a hydrostatic and a non-hydrostatic component for zenith delay and mapping function, there could equally be a differentiation between a purely dry component and a wet component. In this case, the water vapor of the hydrostatic component could be considered in the scope of the wet component.

The invention can be employed for any type of wireless communication system, including but not limited to GSM, CDMA and W-CDMA. Further, the invention can be employed for providing assistance data for any type of GNSS positioning, including but not limited to GPS and GALILEO.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 3 is a table defining message fields for parameters of a troposphere model;

FIG. 4 is a table defining the bits of a fit interval parameter of a troposphere model.

DETAILED DESCRIPTION OF THE INVENTION

Figure 1:
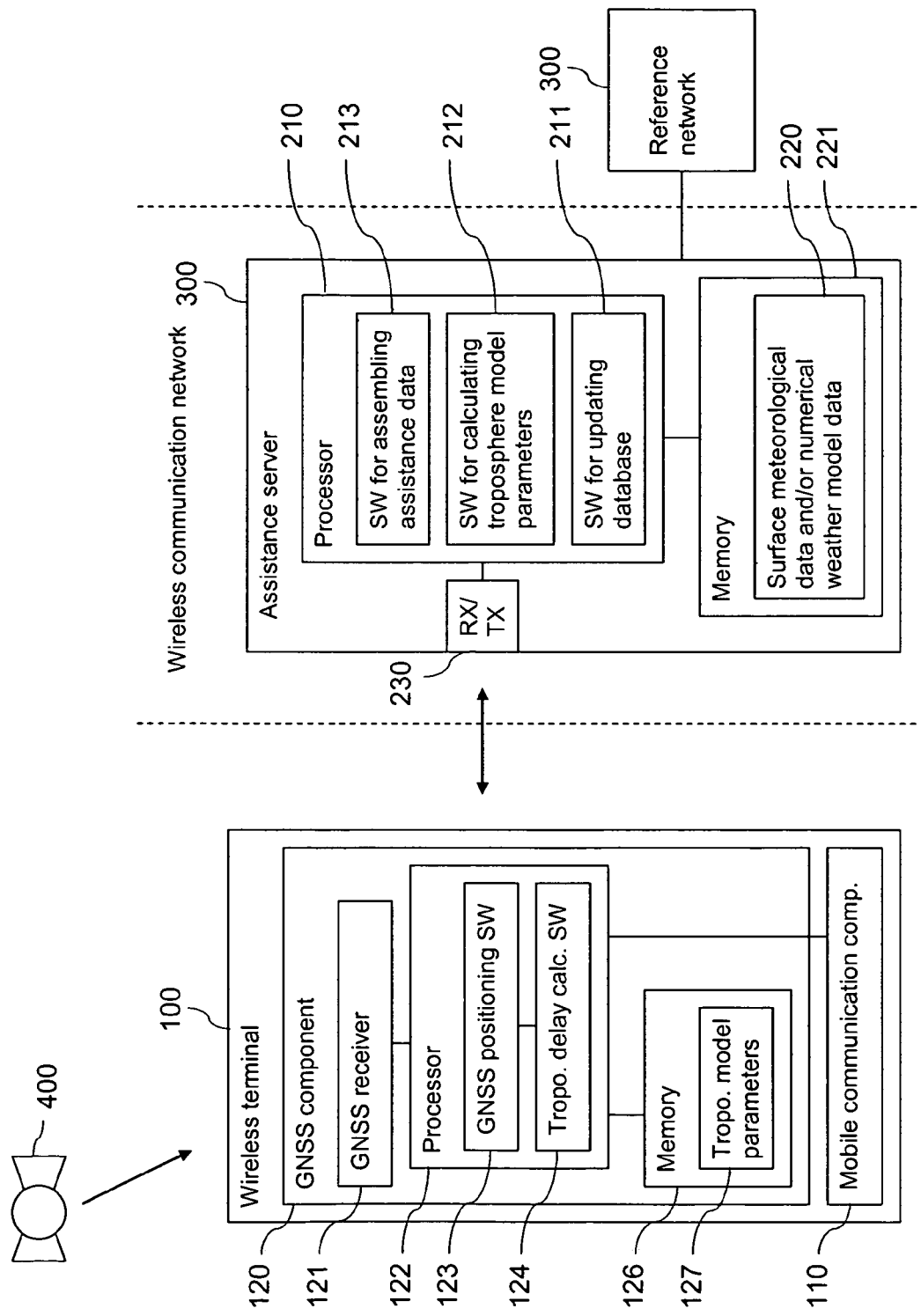
FIG. 1 is a schematic block diagram of a communication system according to an embodiment of the invention.

FIG. 1 is a schematic block diagram of an exemplary communication system, which supports a satellite based positioning in accordance with an embodiment of the invention.

The system comprises a wireless terminal 100 and a wireless communication network including an assistance server 200. The wireless communication network can be for example a GSM, a CDMA or a W-CDMA network. It has to be noted that the assistance server 200 could also be connected to the communication network without belonging to the communication network. The assistance server 200 is further connected to a reference network 300.

The wireless terminal 100 includes a mobile communication component 110, which may include any component of a conventional wireless terminal like a mobile phone. The mobile communication component 110 enables the wireless terminal 100 to establish a link to a base station of the wireless communication network, which is serving a cell in which the wireless terminal 100 is currently located.

The wireless terminal 100 further includes a GNSS component 120, for example a GPS or Galileo component. It has to be noted that the GNSS component 120 could be realized alternatively as a detachable accessory device for a wireless terminal like a mobile phone. The GNSS component 120 comprises a GNSS receiver 121 that is connected to a GNSS antenna (not shown). The GNSS receiver 121 is adapted to signals from a plurality of GNSS satellites 400. The GNSS component 120 further comprises a processor 122 and a memory 126. The processor 122 is adapted to execute various installed software program codes. The installed software program codes include at least positioning software program code 123 and tropospheric delay calculations software program code 124. The memory 126 stores a database 127 for parameter values of a plurality of troposphere models. The memory 126 could also store the software program codes 123, 124 for retrieval by the processor 122 when needed.

It is to be understood that the functions of the processor 122 and/or the memory 126 could alternatively be realized by a processor and a memory, respectively, of the mobile communication component 110. It is further to be understood that instead of or in addition to a processor 122 executing software program codes 123, 124, a chip with circuitry realizing corresponding functions could be employed.

The functions illustrated by the processor 122 when executing software program code 124 can further be viewed as means for receiving via a wireless communication network at least one set of values of parameters, each set of values defining a respective troposphere model. Alternatively, the mobile communication component 110 could be viewed as means for receiving via a wireless communication network at least one set of values of parameters, each set of values defining a respective troposphere model. The processor 122 when executing software program codes 123, 124 can be viewed in addition as means for using an available set of values as assistance data for an assisted satellite based positioning of a wireless terminal.

The wireless terminal 100 is an exemplary embodiment of the wireless terminal arrangement according to the invention.

The assistance server 200 comprises equally a processor 210 and a memory 220. The processor 210 is adapted to execute various installed software program codes. The installed software program codes include a software program code for updating a database in the memory 211, a software program code for determining troposphere model parameters 212 and a software program code for assembling assistance data 213. The memory 220 stores a database 221 with surface meteorological data and/or numerical weather model data. The numerical weather model may be a global model or a local area model, like the High Resolution Limited Area Model (HIRLAM). The memory 220 could also store the software program codes 211, 212, 213 for retrieval by the processor 210 when needed. The assistance server 200 further comprises a receiving and transmitting component (RX/TX) 230 for exchanging data with other elements (not shown) of the wireless communication network.

The assistance server 200 is an exemplary embodiment of the network element according to the invention. The processor 210 and the implemented software program code 211, 212, 213 are an exemplary processing component of an exemplary embodiment of an apparatus according to the invention. The apparatus could comprise in addition other components of the assistance server 200, like the memory 220.

The functions illustrated by the processor 210 when executing software program code 212 can further be viewed as means for determining at least one set of values of parameters, each set of values defining a respective troposphere model, while the processor 210 when executing software program code 213 can be viewed as means for assembling the at least one determined set of parameter values for transmission via a wireless communication network to a wireless terminal as assistance data for an assisted satellite based positioning of the wireless terminal.

The reference network 300 comprises a large number of measurement stations at different locations. The measurement stations may be adapted to receive GNSS signals and/or to perform meteorological measurements.

A first exemplary operation in the system of FIG. 1 will now be described with reference to the flow chart of FIG. 2.

The assistance server 200 constantly receives measurement results from the reference network 300.

On the one hand, the assistance server 200 may receive information for conventional assistance data, for example ephemeris data for all satellites. Based on the received information, the processor 210 of the assistance server 200 may assemble conventional assistance data for a respective base station of the wireless communication network (step 501). It may include for example the location of the base station, a reference time and ephemeris data for all satellites that are currently visible at the base station. The assistance data can be provided to the base station for broadcasting in the cell.

On the other hand, the assistance server 200 receives measured meteorological data, possibly from all over the world. Such data may include for example air pressure, temperature and humidity profiles. These meteorological data are used by the processor 210 for updating the database 221 in the memory 220. Alternatively or in addition, the assistance server 200 could acquire and process or receive numerical weather model data for updating the database 221 in the memory 220.

The GNSS receiver 121 acquires and tracks satellite signals from a plurality of satellites 400. It determines the time of arrival of signals and decodes the included navigation messages. The processor 122 of the GNSS component 120 then determines the current position of the wireless terminal 100 based on the information in the navigation messages and on the time of arrival of the satellite signals (step 511).

In case the mobile communication component 110 receives conventional assistance data in a broadcast message from the assistance provider 200, it provides the data to the GNSS component 120, where they are used for supporting the signal acquisition and/or the position calculations.

While a fairly exact position of the wireless terminal 100 can be determined this way, the application for which the position is required might need a high precision. In this case, the processor 122 further requests via the mobile communication component 110 a troposphere model from the assistance server 200 (step 512). The request may include latitude and longitude values of the determined position, $C_{lat}$ and $C_{lon}$.

The assistance server 200 receives the request and the processor 210 determines thereupon the parameter values for one or more troposphere models, which are valid for a center position defined by the received co-ordinates (step 502). The parameters values are determined based on measurement results and/or numerical weather model data that are stored in the database 221. The values are inserted into fields of a message that will be transmitted to the wireless terminal 100.

FIG. 3 is a table, which presents in a first column the parameters that define a respective troposphere model. The table further presents in a second column the number of bits of a field that is provided in a message for the respective parameter. In order to ensure that the parameter values fit into the provided fields, they are scaled by a predetermined amount and, if necessary, rounded to an integer value. The table presents in a third column the scale factor by which the integer parameter value has to be scaled at the wireless terminal to regain the original values. The table further presents in a fourth column the unit of the parameter, if applicable.

A first group of parameters comprises troposphere model control parameters. They are provided once per model.

The troposphere model control parameters include a parameter "UTC", which indicates the baseline time in seconds for which the parameters of a model are valid. For this compulsory parameter, a field of 32 bits is provided. The parameter value is inserted in the provided field without scaling.

The troposphere model control parameters further include a parameter "Fit Interval", which specifies the validity period of the model. For this parameter, a field of 6 bits is provided. The parameter can have values, which indicate a validity period in a range of 0.125 to 448 hours.

The "Fit Interval" parameter is specified according to a special floating-point representation as illustrated in FIG. 4. FIG. 4 is a table, which presents in a first column possible values of the first three bits of the "Fit Interval" field and in a second column possible values of the last three bits of the "Fit Interval" field. The first three bits represent an exponent e, while the last three bits represent a mantissa m. The third column indicate a floating-point value x, which is obtained by a respective combination of an exponent e and a mantissa m. The fourth column indicates a Fit Interval value F, which indicates a period in hours h that corresponds to a respective floating-point value x. For example, if the field has a value of '110110', this corresponds to an exponent of e=3 and a mantissa of m=3. This constellation is dealt with in the fourth row and results in $x=(m+1)*2^{(e-1)}=16$, that is, the Fit Interval has a value of F=16 hours.

The floating-point value of x=512 has a special meaning; it indicates an infinite Fit Interval for the troposphere model.

The troposphere model control parameters further include parameters "$C_{lat}$" and "$C_{lon}$", which define the latitude and the longitude in semi-circle notation, respectively, of a central point for which the model is valid. For these parameters, a respective field of 14 bits is provided. The parameter values are inserted with a scaling of $2^{13}$ into the provided fields. The troposphere model control parameters further include a parameter "$R_c$", which indicates the distance from the center point to the corner point of a rectangular fit area in meters. For this parameter, a field of 10 bits is provided. The parameter value is inserted in the provided field with a scaling of $2^{-10}$. The rectangular fit area is the area for which the model is valid. A predefined maximum value of $R_c$ indicates that the model is global.

A second group of parameters comprises zenith delay parameters. They are equally provided once per model.

The zenith delay parameters include a parameter "$Z_{h0}$", which indicates the hydrostatic zenith delay in meters, and a parameter "$Z_{w0}$", which indicates the non-hydrostatic zenith delay in meters. The parameters are calculated to the WGS-84/EGM96 reference geoid. For these parameters, a respective field of 12 bits is provided. The parameter values are inserted in the provided fields with a scaling of $2^{-10}$. The parameters can be determined in a conventional manner, for instance using either surface meteorological measurements, meteorological parameters from a gridded database or numerical weather models.

The zenith delay parameters also include height scale terms $s_0$, $s_1$, $e_h$ and $e_w$ that can be used for computing the respective zenith delay at different altitudes h of the wireless terminal. For $s_0$ and $s_1$ a respective field of 14 bits is provided and the values are inserted in the provided fields with a scaling of $2^{26}$ and $2^{32}$, respectively. For $e_h$ and $e_w$ a respective field of 12 bits is provided and the values are inserted in the provided fields with a scaling of $2^{20}$.

A third group of parameters comprise mapping function parameters. They are equally provided once per model.

The mapping function parameters include parameters "$\alpha_0$", "$\alpha_1$" and "$\alpha_2$", which specify continued fractions mapping function parameters for the hydrostatic delay. The mapping function parameters further include parameters "$\beta_0$", "$\beta_1$" and "$\beta_2$", which specify continued fractions mapping function parameters for the non-hydrostatic delay. These mapping functions are used to map the given zenith delays to a particular elevation angle at which a satellite 400 is positioned with relation to the wireless terminal 100. For these parameters, a respective field of 16 bits is provided. The parameter values are inserted in the provided fields with a scaling of $2^{19}$. The parameters can be determined in a conventional manner.

Finally, the mapping function parameters include parameters "$z_0$" and "$z_1$", which enable an estimation of an azimuthal asymmetry (anisotropy) of the troposphere delay. For these parameters, a respective field of 12 bits is provided. The parameter values are inserted in the provided fields with a scaling of $2^5$. The azimuthal asymmetry results from pressure, temperature and humidity gradients. The parameters can thus be determined in a conventional manner based on corresponding meteorological measurements or based on corresponding data from available weather models.

The troposphere model format presented in FIG. 3 enables a long-term localized troposphere delay estimation for high accuracy GNSS navigation solutions. It is suitable for all wireless standards and all GNSS systems.

It has to be noted that the number of bits and the indicated scaling factors in the table of FIG. 3 are only provided as examples. They can be varied in many ways. Further, also the indicated parameters themselves can be varied, as long as they represent in their entirety a troposphere model. For example, instead of hydrostatic and non-hydrostatic zenith delay and mapping function parameters, dry and wet zenith delay and mapping function parameters could be used.

The processor 210 of the assistance server 200 could determine for example parameters for a first, highly accurate model having a small fit area and a short fit interval. In addition, it could determine for example parameters for a second, less accurate model having a large fit area and a long fit interval.

The assistance server 200 then transmits a message with the determined model parameter values to the wireless terminal 100.

In the wireless terminal 100, the mobile communication component 110 forwards the received model parameter values to the processor 122, which stores the values in the database 127 in the memory 126 (step 513).

Further, the processor 122 selects the most suitable of all models, for which parameter values are currently stored in the database 127 (step 514). The model has to be valid for the current time and at the current position of the wireless terminal 100 as determined in step 511. The fit interval is determined by the processor 122 based on the definitions in the table of FIG. 4. In case there are several models meeting these conditions, the one with the smallest fit interval and the shortest fit area may be selected, in order to obtain the most accurate model.

The processor 122 may moreover delete all parameter values from the database 127 that belong to a model of which the fit interval has passed. The parameter values that belong to a model of which the fit area does not fit to the current position of the wireless terminal but of which the fit interval is still valid may be kept in the database 127 for the case that the wireless terminal 100 returns to the fit area at a later point of time.

In case a suitable model is available (step 515), the processor 122 determines the elevation angle $\epsilon$ and the azimuth $\phi$ for all or selected visible satellites (step 516). The angles can be determined based on the position of the wireless terminal 100 and on the position of the satellites 400, both being known from the positioning in step 511.

The processor 122 then determines the hydrostatic zenith delay $Z_h(h)$ and the non-hydrostatic zenith delay $Z_w(h)$ at the current altitude of the wireless terminal 100 as follows:

$$Z_h(h) = s_0 * h + s_1 * h^2 + Z_{h0} * \exp(-e_h * h), \quad (4)$$

$$Z_w(h) = Z_{w0} * \exp(-e_w * h), \quad (5)$$

where $Z_{h0}$, $Z_{w0}$, $s_0$, $s_1$, $e_h$ and $e_w$ are the stored zenith delay parameter values of the selected troposphere model, and where h is the altitude of the wireless terminal 100 determined in the positioning of step 511, given in meters from WGS-84/EGM96 reference geoid. When applying the equations, the stored zenith-delay parameter values are scaled with the associated scale factor indicated in the table of FIG. 3. This zenith delay model could also be used as a reference model for barometric altimeter.

Further this zenith delay model could be utilized as a reference model for a barometric altimeter.

The 122 processor further determines for each of the considered satellites 400 the hydrostatic mapping function $m_h$ for the determined elevation angle $\epsilon$ as follows:

$$m_h(\varepsilon) = \frac{1 + \dfrac{\alpha_0}{1 + \dfrac{\alpha_1}{1 + \alpha_2}}}{\sin(\varepsilon) + \dfrac{\alpha_0}{\sin(\varepsilon) + \dfrac{\alpha_1}{\sin(\varepsilon) + \alpha_2}}}, \quad (6)$$

where $\alpha_0$, $\alpha_1$ and $\alpha_2$ are the stored mapping parameter values for the hydrostatic mapping function.

The processor 122 determines in addition for each of the considered satellites 400 the non-hydrostatic mapping function $m_h$ for the determined elevation angle $\epsilon$ as follows:

$$m_w(\varepsilon) = \frac{1 + \dfrac{\beta_0}{1 + \dfrac{\beta_1}{1 + \beta_2}}}{\sin(\varepsilon) + \dfrac{\beta_0}{\sin(\varepsilon) + \dfrac{\beta_1}{\sin(\varepsilon) + \beta_2}}}, \quad (7)$$

where $\beta_0$, $\beta_1$ and $\beta_2$ are the stored mapping parameter values for the non-hydrostatic mapping function.

When applying the equations for the mapping functions, again all stored mapping parameter values are scaled with the associated scale factor indicated in the table of FIG. 3.

Finally, the processor 122 determines for each of the considered satellites 400 the total tropospheric delay Z as follows (step 518):

$$Z(\epsilon,\phi,h) = Z_h(h) \cdot m_h(\epsilon) + Z_w(h) \cdot m_w(\epsilon) + m_h(\epsilon) \cdot \cot \epsilon [z_0 \cos \phi + z_1 \sin \phi] \quad (8)$$

When applying this equation, also the parameter values $z_0$ and $z_1$ are scaled with the associated scale factor indicated in the table of FIG. 3. The first two terms on the right hand side of this equation indicate the isotropic part of the tropospheric delay, while the third term indicates the anisotropic part, which reflects azimuthal asymmetries in the horizontal layers of the troposphere. It has to be noted that it would also be possible to use the non-hydrostatic mapping function $m_w$ instead of the hydrostatic mapping function $m_h$ in the third term. Further, the assistance server 200 could also provide separate parameter values for hydrostatic and non-hydrostatic delay, in order to enable the processor 122 to determine the third term separately for hydrostatic and non-hydrostatic delay.

The total tropospheric delay Z is thus adjusted to the altitude of the wireless terminal 100, to the elevation angle of the considered satellite 400 and to the azimuth of the considered satellite 400.

The position of the wireless terminal 100 can then be determined again more accurately by taking into account the total tropospheric delay of the signals when determining the progagation time of the signals from a particular satellite 400 to the wireless terminal 100 (step 519).

The process can be continued with step 514, as long as available troposphere models are found in the database 127 in step 514. In case no troposphere model is found in the database 127 that is valid for the current time and the current position of the wireless terminal 100 (step 515), the processor 122 may proceed with requesting new troposphere models from the assistance server 200 via the mobile communication component 110 (step 512).

Figure 2:
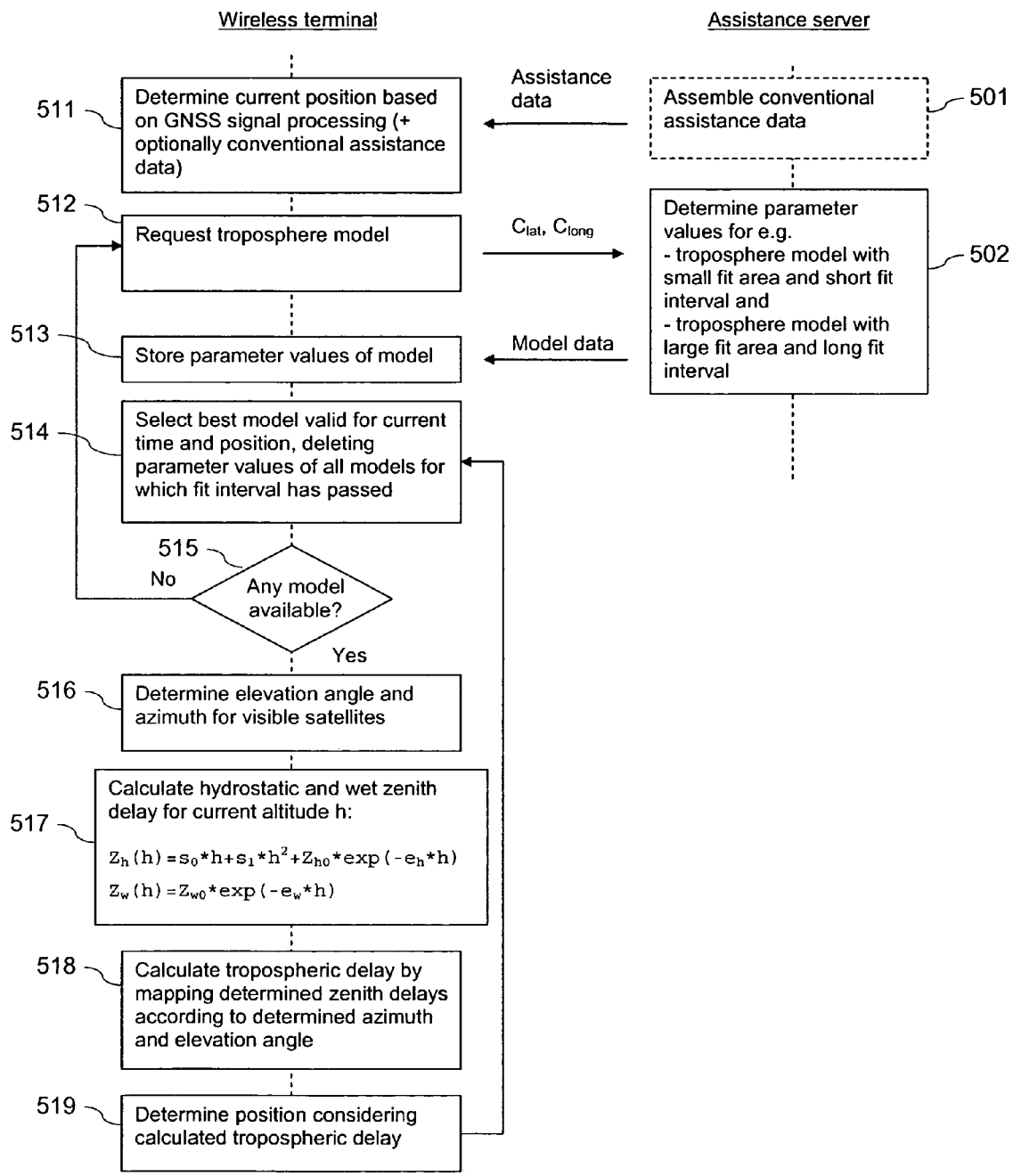
FIG. 2 is a flow chart illustrating a first exemplary operation in the communication system of FIG. 1.

In the operation presented with reference to FIG. 2, the troposphere models are provided by the assistance server 200 upon request from a wireless terminal 100. It is to be understood, though, that they could also be generated at regular intervals for all or selected base stations of the wireless communication network and broadcast in the cell of a respective base station.

Figure 5:
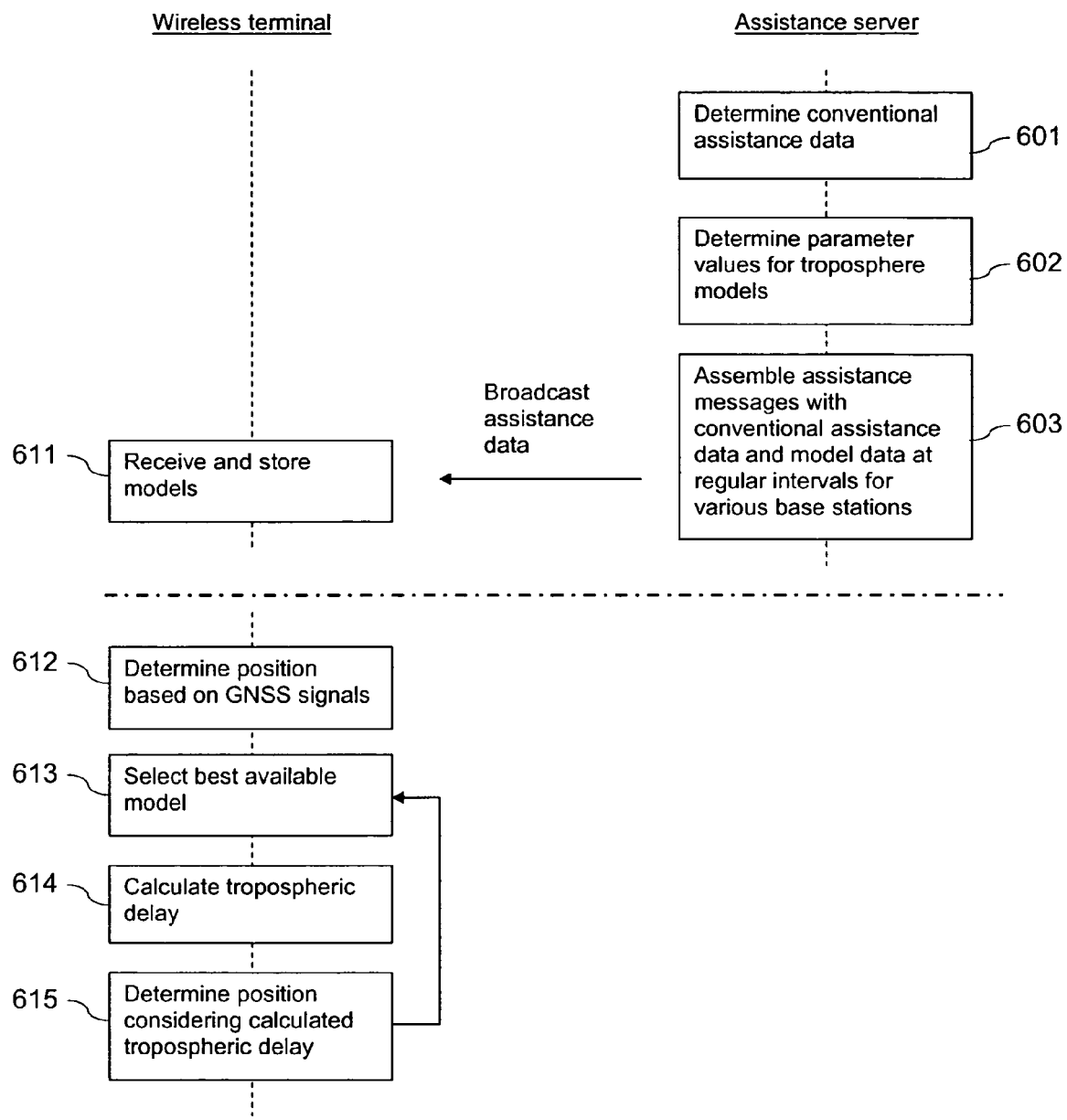
FIG. 5 is a flow chart illustrating a second exemplary operation in the communication system of FIG. 1.

A second exemplary operation in the system of FIG. 1 using such broadcast messages will now be described with reference to the flow chart of FIG. 5.

In this case, the processor 210 of the assistance server 200 determines as well conventional assistance data for the cells served by various base stations (step 601). In addition, the processor 210 calculates the same troposphere model parameter values as described above with reference to FIG. 3 (step 602). However, the center point $C_{lon}$, $C_{lat}$ of a respective model is selected to correspond to the location of a respective base station or to the center point of a cell served by a respective base station. The processor 210 may determine parameter values for one or more models for each cell. It is to be understood that it could also determine parameter values for a common troposphere model having a large fit area for several base stations.

The processor 210 then assembles an assistance message for each base station (step 601). A message comprises conventional assistance data and in addition parameter values for one or more troposphere models in the format presented in the table of FIG. 3.

Each base station transmits the provided assistance message as a broadcast message in its cell.

The wireless terminal 100 receives a broadcast message from at least one base station, and the mobile communication component 110 forwards the content of all received broadcast messages to the processor 122. The processor 122 stores the parameter values for all troposphere models in the database 127 in the memory 126 (step 611).

The GNSS receiver 121 and the processor 122 further use the received conventional assistance data for determining the position of the wireless terminal 100 based on received satellite signals (step 612).

The processor 122 then selects parameter values of a suitable troposphere model from the database 127 as described above (step 613) and calculates the tropospheric delay for all visible satellites as described above (step 614).

The processor 122 then determines the position of the wireless terminal 100 anew, taking account of the determined tropospheric delay of each considered satellite signal (step 615).

This process can be repeated with step 613, as long as an application needs updates of the position of the wireless terminal 100.

The content of the troposphere model database 127 in the memory 126 is updated in parallel, whenever a new broadcast message is received from the wireless communication network.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
   determining at least one set of values of parameters, each set of values defining a respective troposphere model, wherein said parameters comprise parameters for defining a central point of an area in which a troposphere model is valid and a parameter for defining a size of said area; and
   assembling said at least one determined set of parameter values for transmission via a wireless communication network to a wireless terminal as assistance data for an assisted satellite based positioning of at least a part of a wireless terminal arrangement comprising said wireless terminal.

2. The method according to claim 1, wherein said parameters include at least one parameter for defining a time interval during which a troposphere model is valid.

3. The method according to claim 2, wherein said at least one parameter for defining a time interval comprises a parameter for defining a baseline time and a parameter for defining an interval length.

4. The method according to claim 1, wherein said parameters include at least one zenith delay parameter for defining a tropospheric delay that would be experienced by a signal transmitted by a satellite and received by said wireless terminal, when said satellite was located at a zenith of said wireless terminal.

5. The method according to claim 4, wherein said parameters further include at least one parameter for specifying an adaptation rule for adapting a value of said at least one zenith delay parameter to a current altitude of said wireless terminal.

6. The method according to claim 5, wherein said at least one parameter for defining an adaptation of a value of said at least one zenith delay parameter to a current altitude h of said wireless terminal comprises parameters $s_0$, $s_1$, $e_h$ and $e_w$ for adapting a value of a hydrostatic zenith delay parameter $Z_{ho}$ according to the equation:

$$Z_h(h) = s_0*h + s_1*h^2 + Z_{ho}*\exp(-e_h*h),$$

and for adapting a value of a non-hydrostatic zenith delay parameter $Z_{wo}$ according to the equation:

$$Z_w(h) = Z_{wo}*\exp(-e_w*h).$$

7. The method according to claim 4, wherein said parameters include parameters for at least one mapping function, which mapping function maps a value of said zenith delay parameter to a tropospheric delay that is experienced by a signal transmitted by a satellite and received by said wireless terminal, when said satellite is located at a current elevation angle to said wireless terminal.

8. The method according to claim 7, wherein said parameters for at least one mapping function include parameters for a mapping function mapping a hydrostatic zenith delay to a hydrostatic tropospheric delay and parameters for mapping a non-hydrostatic zenith delay to a non-hydrostatic tropospheric delay.

9. The method according to claim 7, wherein said parameters further include at least two gradient parameters for defining an azimuthally asymmetric effect of a tropospheric delay.

10. An apparatus comprising a memory storing software program code and a processor,
    the memory and the software program code configured to, with the processor, cause the apparatus to determine at least one set of values of parameters, each set of values defining a respective troposphere model, wherein said parameters comprise parameters for defining a central point of an area in which a troposphere model is valid and a parameter for defining a size of said area; and
    the memory and the software program code configured to, with the processor, cause the apparatus to assemble said at least one determined set of parameter values for transmission via a wireless communication network to a wireless terminal as assistance data for an assisted satellite based positioning of at least a part of a wireless terminal arrangement comprising said wireless terminal.

11. The apparatus according to claim 10, wherein the memory and the software program code are configured to, with the processor, cause the apparatus to determine for a respective troposphere model at least one parameter value defining a time interval during which said troposphere model is valid.

12. The apparatus according to claim 10, wherein the memory and the software program code are configured to, with the processor, cause the apparatus to determine for a respective troposphere model at least one zenith delay parameter value defining a tropospheric delay that would be experienced by a signal transmitted by a satellite and received by said wireless terminal, when said satellite was located at a zenith of said wireless terminal.

13. The apparatus according to claim 12, wherein the memory and the software program code are configured to, with the processor, cause the apparatus to determine for a respective troposphere model at least one parameter value specifying an adaptation rule for adapting a value of said at least one zenith delay parameter to a current altitude of said wireless terminal.

14. The apparatus according to claim 10, wherein the apparatus is at least one of an assistance server, a component for a network element of a wireless communication network, and a network element of a wireless communication network, said network element further comprising a transmitting component configured to transmit at least one set of parameter values determined and assembled by said apparatus to a wireless terminal as assistance data for an assisted satellite based positioning of said wireless terminal.

15. A system comprising an apparatus according to claim 10 and a wireless terminal configured to receive at least one set of parameter values determined and assembled by said apparatus via a wireless communication network.

16. The apparatus according to claim 11, wherein said at least one parameter for defining a time interval comprises a parameter for defining a baseline time and a parameter for defining an interval length.

17. The apparatus according to claim 13, wherein said at least one parameter for defining an adaptation of a value of said at least one zenith delay parameter to a current altitude h of said wireless terminal comprises parameters $s_0$, $s_1$, $e_h$ and $e_w$ for adapting a value of a hydrostatic zenith delay parameter $Z_{ho}$ according to the equation:

$$Z_h(h) = s_0*h + s_1*h^2 + Z_{h0}*\exp(-e_h*h),$$

and for adapting a value of a non-hydrostatic zenith delay parameter $Z_{wo}$ according to the equation:

$$Z_w(h) = Z_{w0}*\exp(-e_w*h).$$

18. The apparatus according to claim 12, wherein said parameters include parameters for at least one mapping function, which mapping function is configured to map a value of said zenith delay parameter to a tropospheric delay that is experienced by a signal transmitted by a satellite and received by said wireless terminal, when said satellite is located at a current elevation angle to said wireless terminal.

19. The apparatus according to claim 18, wherein said parameters for at least one mapping function include parameters for a mapping function mapping a hydrostatic zenith delay to a hydrostatic tropospheric delay and parameters for mapping a non-hydrostatic zenith delay to a non-hydrostatic tropospheric delay.

20. The apparatus according to claim 18, wherein said parameters further include at least two gradient parameters for defining an azimuthally asymmetric effect of a tropospheric delay.

21. A software program product in which a software program code is stored in a non-transitory readable medium, said software program code, when executed by a processor, causing an apparatus to perform the following:
determining at least one set of values of parameters, each set of values defining a respective troposphere model, wherein said parameters comprise parameters for defining a central point of an area in which a troposphere model is valid and a parameter for defining a size of said area; and
assembling said at least one determined set of parameter values for transmission via a wireless communication network to a wireless terminal as assistance data for an assisted satellite based positioning of at least a part of a wireless terminal arrangement comprising said wireless terminal.

22. An apparatus comprising:
means for determining at least one set of values of parameters, each set of values defining a respective troposphere model, wherein said parameters comprise parameters for defining a central point of an area in which a troposphere model is valid and a parameter for defining a size of said area; and
means for assembling said at least one determined set of parameter values for transmission via a wireless communication network to a wireless terminal as assistance data for an assisted satellite based positioning of at least a part of a wireless terminal arrangement comprising said wireless terminal.

23. A method comprising:
receiving at a wireless terminal via a wireless communication network at least one set of values of parameters, each set of values defining a respective troposphere model, wherein said parameters comprise parameters for defining a central point of an area in which a troposphere model is valid and a parameter for defining a size of said area; and
using an available set of values as assistance data for an assisted satellite based positioning of at least a part of a wireless terminal arrangement comprising said wireless terminal.

24. The method according to claim 23, further comprising selecting an available set of parameters for a troposphere model that is valid for a current time and for a current location of said wireless terminal as assistance data.

25. An apparatus comprising a memory storing software program code, and a processor,
the memory and the software program code configured to, with the processor, cause the apparatus to receive at least one set of values of parameters that has been provided to a wireless terminal via a wireless communication network, each set of values defining a respective troposphere model, wherein said parameters comprise parameters for defining a central point of an area in which a troposphere model is valid and a parameter for defining a size of said area; and
the memory and the software program code configured to, with the processor, cause the apparatus to use an available set of values as assistance data for an assisted satellite based positioning of at least a part of a wireless terminal arrangement comprising said wireless terminal.

26. The apparatus according to claim 25, wherein the memory and the software program code are configured to, with the processor, cause the apparatus to select an available set of parameters for a troposphere model that is valid for a current time and for a current location of said wireless terminal arrangement as assistance data.

27. The apparatus according to claim 25, wherein the apparatus is one of a wireless terminal and a global navigation satellite system component for a wireless terminal.

28. A software program product in which a software program code is stored in a non-transitory readable medium, said software program code, when executed by a processor, causing an apparatus to perform the following:
receiving at least one set of values of parameters that has been provided to a wireless terminal via a wireless communication network, each set of values defining a respective troposphere model, wherein said parameters comprise parameters for defining a central point of an area in which a troposphere model is valid and a parameter for defining a size of said area; and using an available set of values as assistance data for an assisted satellite based positioning of at least a part of a wireless terminal arrangement comprising said wireless terminal.

29. An apparatus comprising:

means for receiving via a wireless communication network at least one set of values of parameters, each set of values defining a respective troposphere model, wherein said parameters comprise parameters for defining a central point of an area in which a troposphere model is valid and a parameter for defining a size of said area; and means for using an available set of values as assistance data for an assisted satellite based positioning of at least a part of a wireless terminal arrangement comprising a wireless terminal.

* * * * *